Aug. 23, 1949.  R. D. LOWRY ET AL  2,480,082
METHOD OF PACKAGING FOODS TO BE FROZEN
Filed Oct. 1, 1947

INVENTORS.
Robert D. Lowry
BY Carroll R. Irons

Griswold & Burdick
ATTORNEYS

Patented Aug. 23, 1949

2,480,082

UNITED STATES PATENT OFFICE 2,480,082

METHOD OF PACKAGING FOODS TO BE FROZEN

Robert D. Lowry and Carroll R. Irons, Midland, Mich., assignors to The Dow Chemical Company, Midland, Mich., a corporation of Delaware Application October 1, 1947, Serial No. 777,358

4 Claims. (Cl. 99—194)

This invention relates to a method of packaging foods preparatory to freezing. It relates in particular to such a method for use in packaging fowls or other carcasses of irregular contour, to minimize or prevent freezer burn, which method is capable of being used to advantage by families and individuals preparing food for their own consumption.

It is well known that many types of foods, and especially fowls and other carcasses of irregular contour, often exhibit a condition known as "freezer burn" when subjected to storage in a frozen condition. It is presumed that this is due to surface dehydration of the frozen article and is observed to be most prevalent at those locations on the surface of the food where the food is necessarily out of contact with the "protective" wrapper.

It is an object of this invention to provide a method of packaging foods preparatory to freezing whereby freezer burn may be substantially eliminated. A particular object is to provide such a method for packaging fowls or other carcasses of irregular contour. Related objects may appear hereinafter.

According to the invention, the object to be prepared for freezing is placed in a water-tight, thin-walled bag or pouch of appropriate size, the object in the bag is covered with water and the air is allowed or caused to escape from cavities in or irregularities on the object, the mouth of the bag is closed below the water level so as not to entrap air above the contained water, the bag is inverted, water is allowed to drain slowly from the constricted mouth of the bag without admitting air thereto, drawing the bag into close contact with as much as possible of the surface of the enclosed object, and the mouth of the bag is tied, sealed or clamped shut to retain the object and water. All cavities and irregularities which would normally be air pockets, separating a portion of the object from the enclosing bag, are now full of water. The amount of water remaining in the bag is just sufficient to fill said cavities and irregularities in contour and to provide, in addition, not more than a thin layer between the object and the bag. The entire assembly may be frozen and stored for any desired period without danger of detectable dehydration and freezer burn.

The invention is illustrated in the accompanying drawing, wherein

Figure 1:
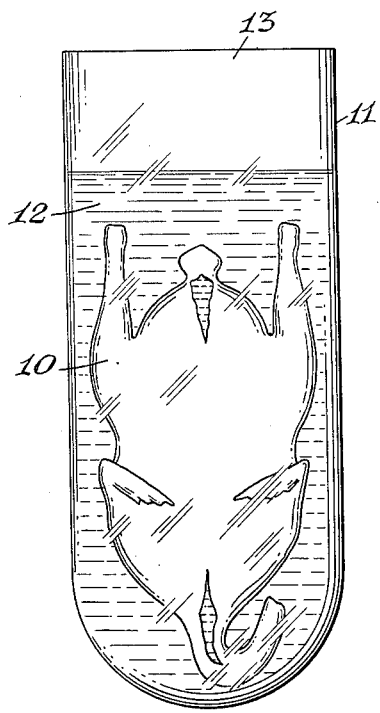
Fig. 1 shows a drawn and dressed fowl filled and covered with water in a transparent "freezer bag"
Figure 2:
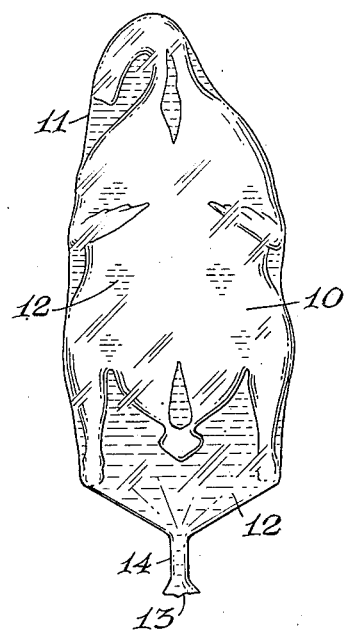
Fig. 2 shows the neck of the bag, now inverted, constricted so as to regulate the discharge of excess water and accompanying conformation of the bag to the enclosed carcass.
Figure 3:
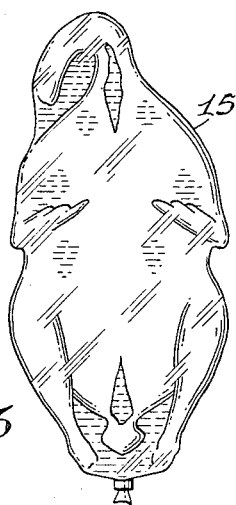
Fig. 3 shows the final sealed package, containing the fowl and protective water, ready for freezing.

In a specific example, each of six dressed and drawn chickens 10, with the giblets replaced in the body cavity, was placed in a flexible transparent bag 11 made of a water-impermeable vinylidene chloride copolymer. Each chicken was placed in a bag 11 of a size to fit as snugly as possible. The bags 11 ranged from 5 to 6 inches in diameter (8 to 9.5 inches flat width) and were from 12 to 15 inches long. The bags 11 containing the chickens 10 were each filled with water 12 and the mouths 13 of the bags were closed by constricting the bags to form necks 14 therein. The bags were rubbed and shaken slightly to cause any contained air to work its way to the surface of the water and escape from the bag. The assembly was then inverted, as shown in Fig. 2, and water 12 was allowed to drain slowly through neck 14 of bag 11 until the bag collapsed closely about and conformed to the shape of the enclosed chicken 10. The packages were then sealed by tying or clamping shut the neck portion 14 of each bag 11. The weight of the finished packages 15 was found to be from 2.4 to 4 ounces heavier than the weight of the corresponding chickens alone, indicating that a relatively small amount of water remained in the packages to be frozen. The chickens had weighed (with their cleaned giblets) from 35 to 48 ounces, so that the weight of water in the package did not exceed 7 per cent of the weight of the chicken. The packages were frozen quickly, and were stored under freezing conditions for six months. No air pockets were visible in the packages at any time, and no freezer burn was found on any of the chickens. After defrosting, the chickens were cooked and eaten and were found to be in excellent condition.

The invention has been illustrated with respect to the packaging of chickens for freezing, but is clearly not limited to such use. Ducks, turkeys, geese, game birds, rabbits, lambs, roasts, chops, brains, kidneys, fish, pork shoulders, quarters of beef, and the like, as well as corn on the cob and other vegetables, and fruits, may all be packed with advantage by the described method. For convenience, the term "meat" will be used in the appended claims to include fish and fowl as well as game and other edible flesh, whether in the form of whole carcasses, or cut up to form quarters, roasts, chops and the like. The method is much simpler to operate, and is better adapted to household use, than any of the other known methods for causing freezer bags to conform closely to their contents, and affords protection against dehydration and freezer burn which none of the other methods can equal.

The bag employed in the process of the invention may be any flexible bag or pouch capable of holding water, and the bag material may be waxed paper, coated regenerated cellulose, rubber hydrochloride, vinyl chloride-acetate copolymer, or a vinylidene chloride copolymer, or it may be a heat-shrinkable material, such as temporarily racked unvulcanized natural or synthetic rubber. If desired, when using a heat-shrinkable bag, the water-filled package may be immersed briefly in boiling water to cause the bag to conform even more closely to the enclosed object, before freezing.

We claim:

1. The method which comprises placing a food article of irregular contour in a water-tight, thin-walled flexible bag, covering the article in the bag with water so as to displace air pockets from in and around the article, closing the bag below the water level, inverting the bag, releasing water slowly through the constricted neck of the bag without admitting air thereto, to draw the bag closely into contact with as much as possible of the outer surface of the enclosed article, closing the neck of the bag to retain the article and sufficient water to fill cavities and surface irregularities thereof, and freezing the resulting packed article.

2. The method which comprises placing a meat article of irregular contour in a water-tight, thin-walled flexible bag, covering the article in the bag with water so as to displace air pockets from in and around the article, closing the bag below the water level, inverting the bag, releasing water slowly through the constricted neck of the bag without admitting air thereto, to draw the bag closely into contact with as much as possible of the outer surface of the enclosed article, closing the neck of the bag to retain the article and sufficient water to fill cavities and surface irregularities thereof, and freezing the resulting packed article.

3. The method which comprises placing a dressed and drawn fowl in a water-tight, thin-walled flexible bag, covering the fowl in the bag with water so as to displace air pockets from in and around the fowl, closing the bag below the water level, inverting the bag, releasing water slowly through the constricted neck of the bag without admitting air thereto to draw the bag closely into contact with as much as possible of the outer surface of the fowl, closing the neck of the bag to retain the fowl and sufficient water to fill cavities and surface irregularities thereof, and freezing the resulting packed fowl.

4. The method claimed in claim 2, wherein the meat article is the dressed carcass of a small animal.

ROBERT D. LOWRY.
CARROLL R. IRONS.

REFERENCES CITED

The following references are of record in the file of this patent:

UNITED STATES PATENTS

| Number | Name | Date |
| --- | --- | --- |
| 2,071,300 | Gammeter | Feb. 16, 1937 |
| 2,280,827 | Hoveman | Apr. 28, 1942 |